(12) United States Patent
Chen

(10) Patent No.: US 7,992,805 B2
(45) Date of Patent: Aug. 9, 2011

(54) FEED NOZZLE ASSEMBLY

(75) Inventor: Ye-Mon Chen, Sugar Land, TX (US)

(73) Assignee: Shell Oil Company, Houston, TX (US)

( * ) Notice: Subject to any disclaimer, the term of this patent is extended or adjusted under 35 U.S.C. 154(b) by 1609 days.

(21) Appl. No.: 10/987,040

(22) Filed: Nov. 12, 2004

(65) Prior Publication Data

US 2005/0109861 A1 May 26, 2005

Related U.S. Application Data

(60) Provisional application No. 60/519,755, filed on Nov. 13, 2003.

(51) Int. Cl.
*B05B 7/04* (2006.01)
(52) U.S. Cl. ............ 239/434.5; 239/433; 239/554; 239/567; 239/568; 239/597; 239/601
(58) Field of Classification Search .......... 239/429, 239/430, 433, 434.5, 548, 554, 567, 568, 239/589, 597, 599, 601; 208/113, 157
See application file for complete search history.

(56) References Cited

U.S. PATENT DOCUMENTS

| | | | | |
|---|---|---|---|---|
| 1,522,951 A | * | 1/1925 | Gilmore | 239/430 |
| 1,526,061 A | * | 2/1925 | Glendenning | 239/431 |
| 2,933,259 A | * | 4/1960 | Raskin | 239/405 |
| 3,595,480 A | * | 7/1971 | Kunioka et al. | 239/132.3 |
| 3,654,140 A | | 4/1972 | Griffel et al. | 208/113 |
| 4,784,328 A | | 11/1988 | Skraba | 239/432 |
| 4,948,568 A | | 8/1990 | Chessmore et al. | 422/140 |
| 5,289,976 A | * | 3/1994 | Dou et al. | 239/431 |
| 5,306,418 A | | 4/1994 | Dou et al. | |
| 5,673,859 A | | 10/1997 | Haruch | |
| 5,794,857 A | | 8/1998 | Chen et al. | |
| 5,968,601 A | * | 10/1999 | Leon et al. | 427/424 |
| 6,012,652 A | | 1/2000 | Holtan et al. | |
| 6,387,247 B1 | | 5/2002 | Chen | |
| 6,599,464 B1 | * | 7/2003 | Feldhaus | 266/87 |

FOREIGN PATENT DOCUMENTS

EP 717095 6/1996

* cited by examiner

*Primary Examiner* — Dinh Nguyen
(74) *Attorney, Agent, or Firm* — Charles W. Stewart

(57) ABSTRACT

A feed nozzle assembly for introducing a mixture of a gas and a liquid hydrocarbon droplets into a vessel in the form of a substantially sheet-like spray, which feed nozzle assembly comprises a nozzle body provided at its upstream part with means to supply the gas and means to supply the liquid hydrocarbon to said nozzle body and at the downstream end with a closed outlet end which outlet end is provided with an elongated opening wherein in the opening an insert is positioned such that a continuous loop opening results for discharge of the mixture of gas and liquid droplets.

20 Claims, 5 Drawing Sheets

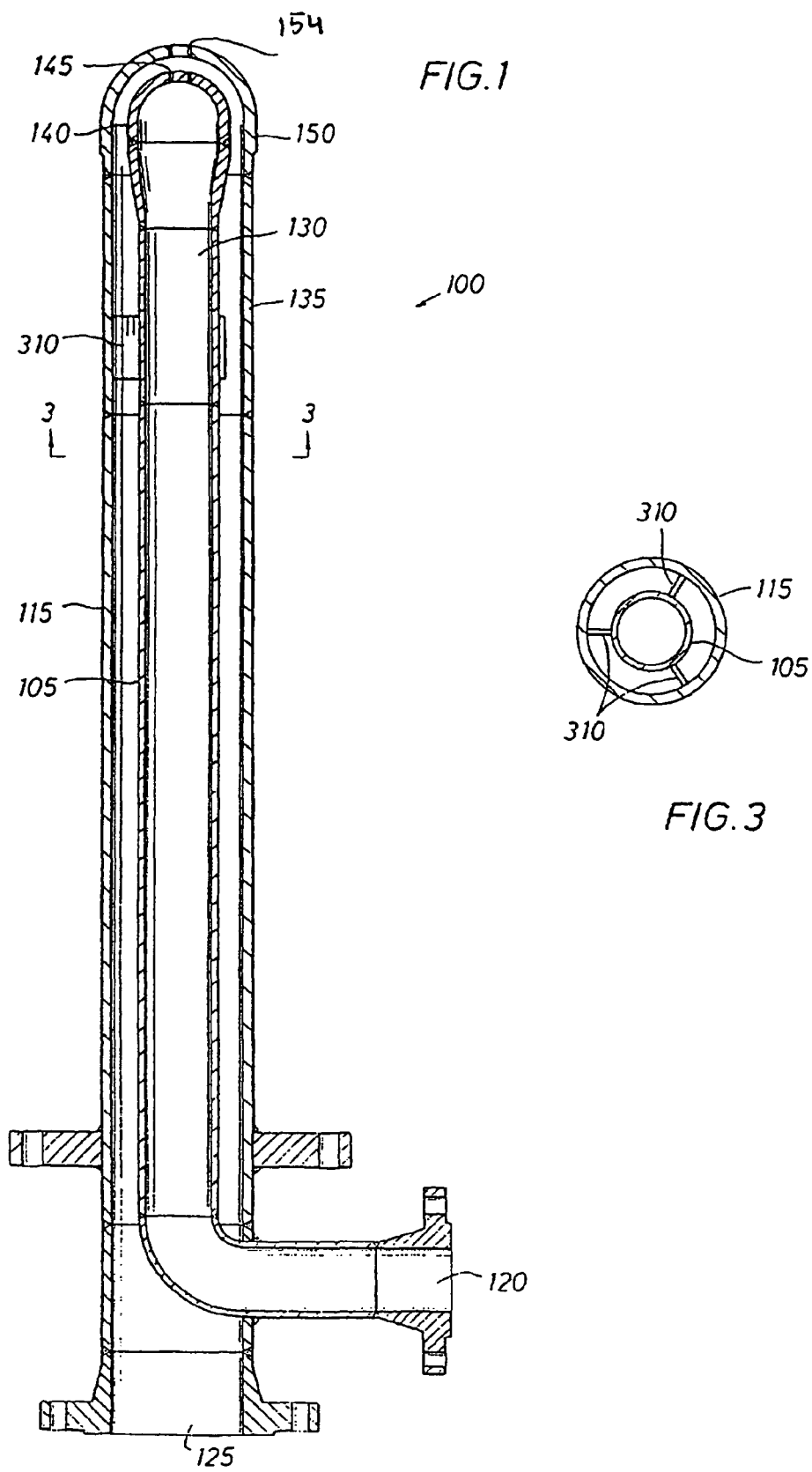

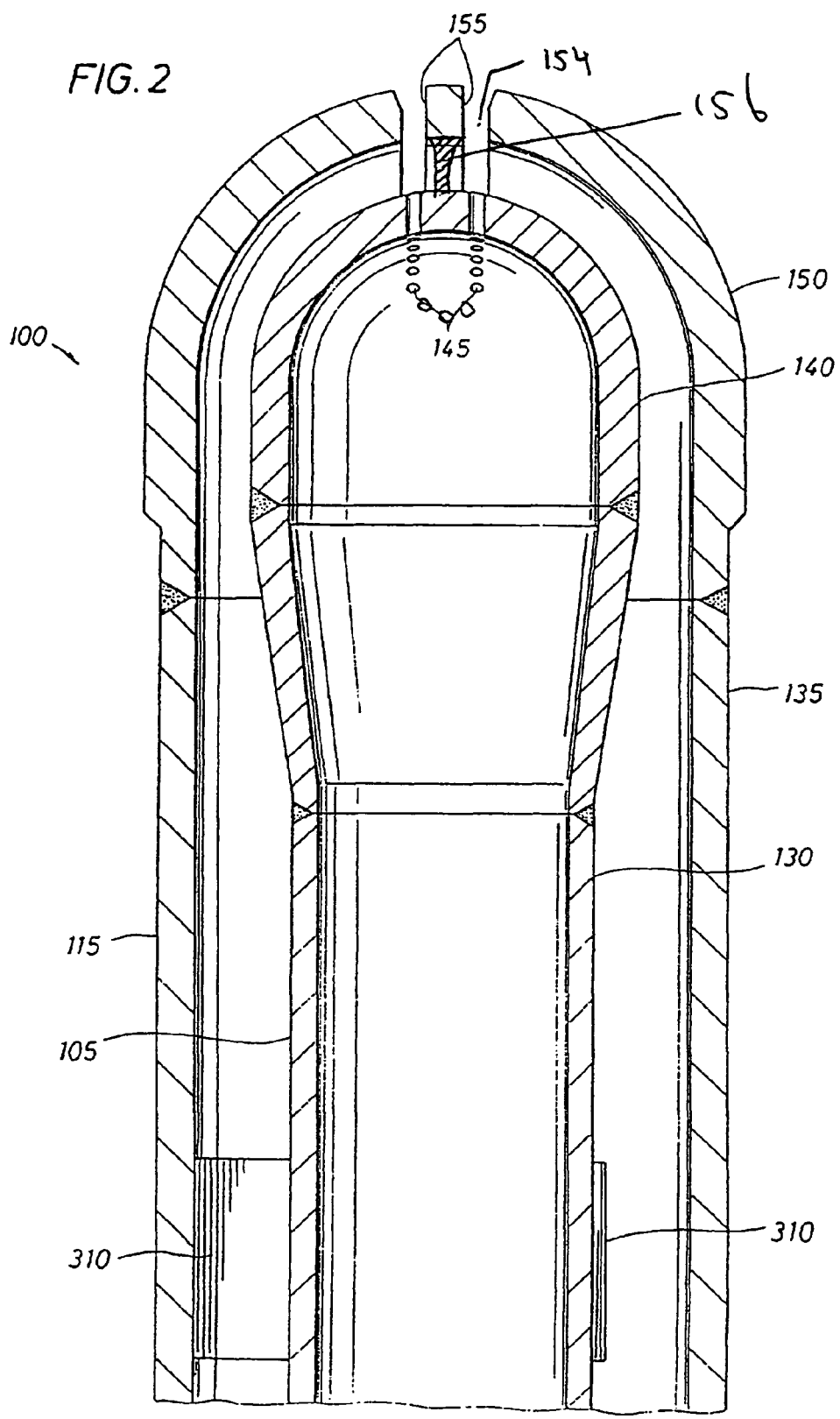

FEED NOZZLE ASSEMBLY

This application claims the benefit of U.S. Provisional Application No. 60/519,755, filed Nov. 13, 2003.

FIELD OF THE INVENTION

The invention is directed to a feed nozzle assembly for introducing a mixture of a gas and a liquid hydrocarbon into a vessel in the form of a substantially sheet like spray.

BACKGROUND OF THE INVENTION

A single contact zone of the hydrocarbon feedstock with the catalyst is important in a fluid catalytic cracking (FCC) process in order to control the reaction time in the riser. Moreover, a fast mixing of the liquid hydrocarbon feed and the hot regenerated catalysts is desirable to vaporize the feed. The feed nozzle assembly of U.S. Pat. No. 5,306,418 was able to achieve these objectives by having the nozzle assembly inserted from the periphery of the riser reactor, known as side-entry in the industry, and discharging a single sheet-like spray through a single slit opening at the outlet end of the nozzle assembly.

U.S. Pat. No. 5,673,859 described several feed nozzle assembles for similar side-entry applications, one assembly having two converging slits, another having two parallel slits and another having two diverging slits for discharge of a mixture of gas and hydrocarbon liquids. It was described in U.S. Pat. No. 5,673,859 that these nozzle assembles with two discharge slits had the advantage of providing better contacting with catalyst compared to those with a single slit opening, such as U.S. Pat. No. 5,306,418.

U.S. Pat. No. 5,794,857 and U.S. Pat. No. 6,012,652 further described different variations of nozzle assemblies with multiple slit openings at the outlet ends of the nozzle for the side entry application.

U.S. Pat. No. 6,387,247 described a feed nozzle assembly for inserting the nozzle from the bottom of a FCC riser reactor, known as bottom entry in the industry. The spray discharged from such a feed nozzle has the form of a hollow cone. This nozzle cannot achieve a single contact zone of the hydrocarbon feedstock with the catalyst if it is applied to a side entry nozzle configuration because of the discharge being a hollow cone spray.

Although it is commonly understood that the feed nozzle assembly for side entry application with multiple outlet slits, such as U.S. Pat. No. 5,673,859, has the advantage of providing better feed contacting compared to the one with a single outlet slit, such as U.S. Pat. No. 5,306,418, a major disadvantage of the former is that erosion could take place through the gaps in between the multiple slit openings as a result of FCC catalyst particles moving past through these gaps at high velocities, possibly due to a vacuum effect between adjacent sheet like sprays.

One object of the present invention is to create a feed nozzle assembly, which has the advantageous operating properties of a single contact zone with a sheet-like spray. Another objective is to have a feed nozzle assembly providing good feed contacting, such as the nozzle disclosed in for example U.S. Pat. No. 5,794,857 with multiple slits, but is less prone to erosion.

SUMMARY OF THE INVENTION

These objects are achieved with the following feed nozzle assembly. A feed nozzle assembly for introducing a mixture of gas and liquid hydrocarbon droplets into a vessel in the form of a substantially sheet-like spray, which feed nozzle assembly comprises a nozzle body provided at its upstream part with means to supply the gas and means to supply the liquid hydrocarbon to said nozzle body and at the downstream end with a outlet end which outlet end is provided with an elongated opening wherein in the opening an elongated insert is positioned such that a continuous loop opening results for discharge of the mixture of gas and liquid droplets.

Applicants have found that when the feed nozzle according to the invention is used; a uniform, substantially sheet-like spray is generated, providing a single layer contacting and which feed nozzle is less prone to erosion.

The invention is also directed to a reactor riser provided with the above feed nozzles as side entry feed nozzles and use of the reactor-feed nozzle assembly in a process wherein catalysts and a liquid hydrocarbon are contacted.

The invention is also directed to a reactor riser provided with the above feed nozzles as bottom entry feed nozzles and use of the reactor-feed nozzle assembly in a process wherein catalysts and a liquid hydrocarbon are contacted.

BRIEF DESCRIPTION OF THE DRAWINGS

FIG. 1 is a cross-sectional view of the invention taken along the longitudinal axis.

FIG. 2 is an enlarged view of the nozzle of FIG. 1.

FIG. 3 is a cross-sectional view taken along reference line 3-3 of FIG. 1.

DETAILED DESCRIPTION OF THE INVENTION

Figure 4:
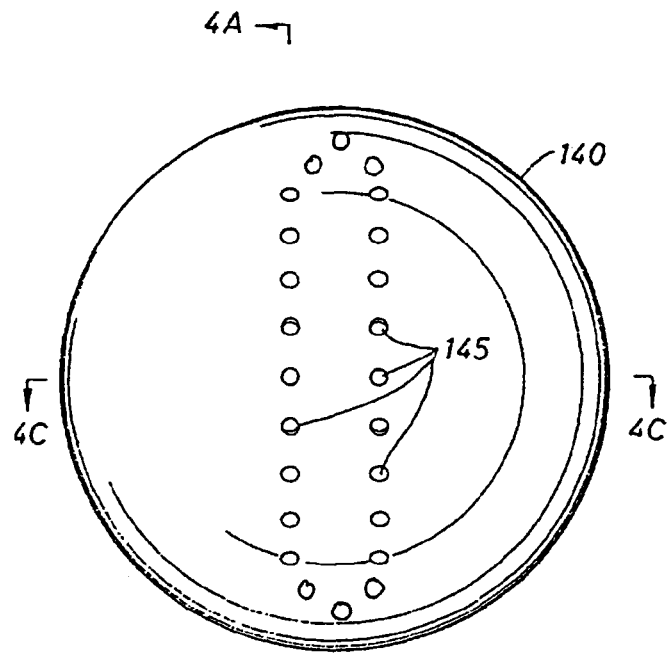
FIG. 4A is a plan view of the first nozzle tip.
FIG. 4B is a cross-sectional view of the first nozzle tip taken along reference line 4C-4C in FIG. 4A.
Figure 4:
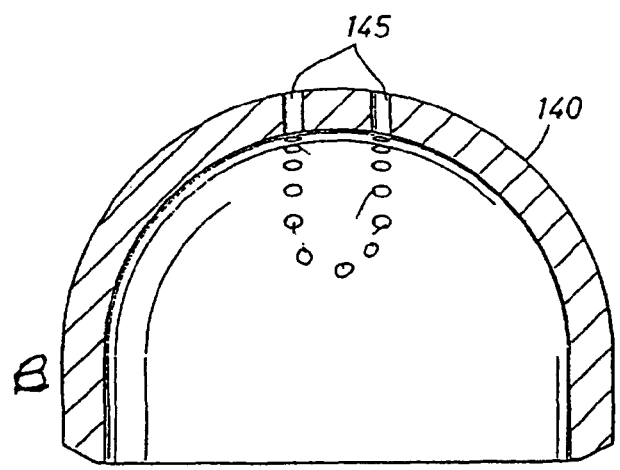

Although the feed nozzle assembly for side entry application with multiple outlet slits, such as U.S. Pat. No. 5,673,859, has the advantage of providing better feed contacting compared to the ones with a single outlet slit, such as U.S. Pat. No. 5,306,418, a major disadvantage of the former is that under some circumstances erosion to the nozzle outlet end may occur. Applicants believe that the disadvantage of the prior art feed nozzles with multiple slits, such as disclosed in U.S. Pat. No. 5,794,857 and U.S. Pat. No. 5,673,859, is that erosion could take place through the gaps in between the multiple slit openings as a result of FCC catalyst particles moving past through these gaps at high velocities, possibly due to a vacuum effect between adjacent sheet like sprays. Applicants believe that catalyst is drawn into this gap, due to the same vacuum effect to cause the convergence of the adjacent sheet like sprays.

Applicants further believe that the present invention can achieve the objective of preserving the advantages of the feed nozzle assembly for side entry application with multiple outlet slits for providing better feed contacting while avoiding the disadvantages of possible erosion problem by using the new design according to the present invention.

One preferred embodiment of the present invention is to have a feed nozzle assembly with a loop opening at the outlet end, which is a continuous opening. Instead of having two separated elongated slit openings and a gap in between them open to catalyst attack, such as U.S. Pat. No. 5,673,859, the present invention has an outlet opening which connects the ends of the two elongated slits with two half loop slits, forming a continuous loop slit and thus closing the gap between the two elongated slits which is prone to catalyst attack.

In order to achieve such a continuous loop slit, an insert is positioned in association with an elongated opening. The insert is preferably fixed to an upstream position in the nozzle body. Although the different Figures show the nozzle outlet with a single loop slit, the present invention also covers a number of variations, such as positioning multiple inserts into an elongated opening to form multiple loop openings.

The elongated opening preferably is elongated such that substantially parallel sheets of sprays are emitted from the two elongated sections of the loop opening. More preferably the elongated opening is defined by its maximum length l and its maximum width h, wherein the length l is measured along the optionally curved surface of the closed end of the feed nozzle body. The ratio of l/h is preferably greater than 1.5 and smaller than 20, more preferably greater than 3 and preferably smaller than 10.

An even more erosion resistant opening is obtained when the width of the elongated opening h is between 1.5 and 20 cm and more preferably between 2 and 15 cm. Also preferred to obtain an even more erosion resistant feed nozzle is to use a wall thickness of the downstream end of the nozzle body at the location of the elongated slit is between 0.5 and 10 cm.

Preferably the outlet end of the nozzle body is dome shaped because this achieves a more evenly distributed sheet-like spray being emitted from the loop opening.

The feed nozzle according to the present invention will preferably be provided with means to form a mixture of gas and liquid hydrocarbon droplets, also referred to as atomizing means. Such atomizing means may be as for example described in EP-A-717095. Preferably the feed nozzle is as described below wherein the atomizing means are achieved by the specific design of the loop opening and the means to supply gas and liquid hydrocarbon. Such a preferred feed nozzle has a nozzle body comprising of:

(a) a substantially cylindrical inner tube defining a gas conduit fluidly connected to the means to supply gas at its upstream end and a dome shaped downstream end, which dome shaped outlet end is provided with one or more gas outlet openings;
(b) an annular liquid hydrocarbon conduit defined by the outer surface of the inner tube and the inner surface of the nozzle body, which liquid hydrocarbon conduit is fluidly connected to the means to supply liquid hydrocarbons at its upstream end;
(c) wherein the gas outlet openings of the gas conduit are substantially aligned with the loop opening in the dome shaped end of the nozzle body; and wherein
(d) the insert positioned in the elongated opening of the nozzle body is fixed to the gas conduit.

The feed nozzle may have dimensions and design for the nozzle body and the inner tube as described in more detail in U.S. Pat. No. 5,794,857, which reference is hereby incorporated by reference.

Preferably the downstream end of the inner tube is dome shaped. This downstream end is provided with one or more gas outlet openings. The gas outlet opening is preferably single or multiple rows of holes. Through these holes gas, preferably steam, will flow into the heavy petroleum hydrocarbon passing through the outer heavy petroleum hydrocarbon conduit. This results in a mixture of steam and heavy petroleum hydrocarbon having a velocity in the direction of the gas being emitted from said holes. Because openings in the gas conduit are substantially aligned with the loop opening in the nozzle body the mixture of hydrocarbons and gas are directed to the loop opening. As a result of the pressure of both hydrocarbons and gas a fine atomization of the hydrocarbon results.

Typically the openings in the closed end of the inner gas tube will consist of at least one row of small holes, numbering from about 7 to about 50 and ranging in size from about one-sixteenth inch to about three-eighth inch in diameter, which line up with each corresponding loop opening in the nozzle body. The angle formed from the substantially spherical or elliptical center of the typically substantially hemi-spherical or hemi-elliptical outlet end of the inner tube through the length of the rows of openings is preferably from 45° to 120°.

In the process for catalytically cracking a heavy petroleum hydrocarbon a heavy petroleum hydrocarbon is preheated, mixed with steam, and fed into a catalytic cracking reactor riser. The heavy petroleum hydrocarbon is then contacted with a cracking catalyst to produce light hydrocarbons and spent catalyst coated with a thin coke layer. The light hydrocarbons are removed from the reactor. The spent catalyst coated with a thin coke layer is passed to a regenerator vessel. At least a portion of the coke is then burned off the spent catalyst. This results in a regenerated catalyst.

Steam is passed through the substantially cylindrical inner steam conduit into the heavy petroleum hydrocarbon. This results in the forming of a fine two-phase mixture by the steam bubbles jetting through the hydrocarbon mixture. The fine two-phase mixture of steam and heavy petroleum hydrocarbons passes through the feed nozzle outlet into the catalytic cracking reactor, resulting in fine atomization.

FIG. 1 depicts a side sectional view of one embodiment of the invention. Feed nozzle assembly 100 includes inner steam conduit 105 and outer annular oil (or liquid) conduit 115. Inner steam (or gas) conduit 105 has inlet end 120 and outlet end 130. Outer annular oil conduit 115 has inlet end 125 and outlet end 135.

First nozzle tip 140 is attached at its inlet end to outlet end 130 of inner steam conduit 105. The outlet end of first nozzle tip 140, opposite its inlet end, is a substantially hemi-spherical or hemi-elliptical outlet end. The outlet end of first nozzle tip 140 has, in one embodiment, a loop row of a plurality of passageways 145 for the passage of steam.

Second nozzle tip 150 is attached at its inlet end to outlet end 135 of outer annular oil conduit 115. The end of second nozzle tip 150 opposite its inlet end is preferably a substantially hemi-spherical or hemi-elliptical outlet end. The outlet end of second nozzle tip 150 is provided with an elongated opening 154.

FIG. 2 shows an enlarged view, in one embodiment, depicting the first and second nozzle tips. The numbering of these elements is the same as used in FIG. 1. In this Figure an insert 155 is shown in opening 154. Insert 155 is fixed to inner conduit 105 by means of bridging part 156.

FIG. 3 is a cross-sectional view taken along reference line 3-3 of FIG. 1 of one embodiment of the feed nozzle assembly. Inner steam conduit 105 is centered within the outer annular oil conduit 115 by spacer studs 310.

FIG. 4A is a plan view of the first nozzle tip. FIG. 4B is a cross-sectional view of the first nozzle tip taken along reference line 4C-4C in FIG. 4B. First nozzle tip 140 is depicted along with a loop row of passageways 145.

Figure 5:
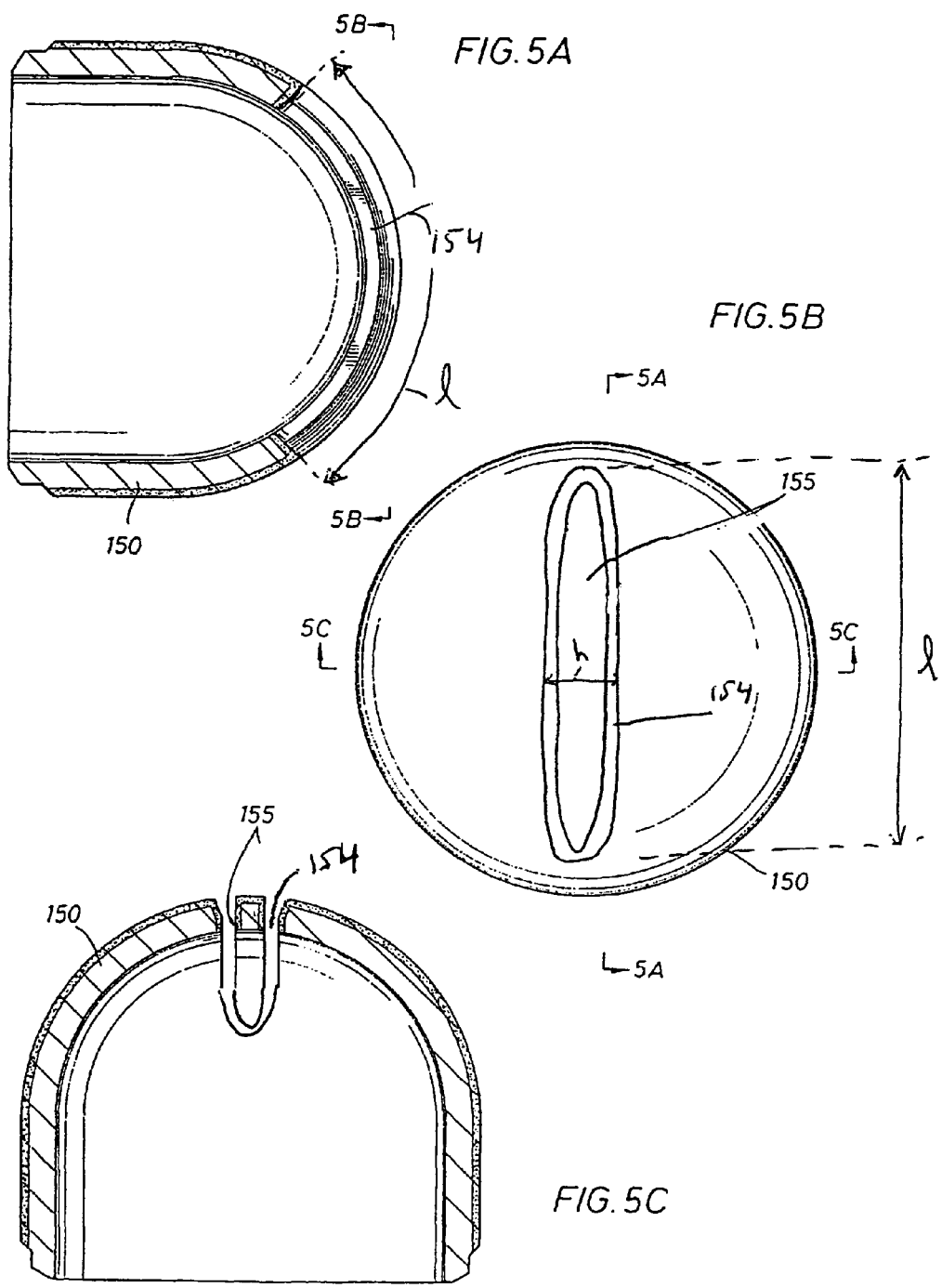
FIG. 5A is a cross-sectional view of the second (feed) nozzle tip taken along reference line 5A-5A in FIG. 5B.
FIG. 5B is a plan view of the second nozzle tip.
FIG. 5C is a cross-sectional view of the second nozzle tip taken along reference line 5C-5C in FIG. 5B.

FIG. 5A is a cross-sectional view of the second (feed) nozzle tip taken along reference line 5A-5A in FIG. 5B. FIG.

5B is a plan view of the second nozzle tip. In FIG. 5B the elongated opening 154 and the insert 155 is shown from above. Clearly is shown that the resulting opening for passage of gas and liquid is a continuous loop opening and not interrupted by any bridges from insert to second nozzle tip 150. FIGS. 5A and 5B shows how the length l and the width h of the elongated opening 154 is measured along the optionally curved surface of the closed end of the feed nozzle body. Although FIG. 5B shows the nozzle outlet with a single loop slit, the present invention also covers a number of variations, such as positioning multiple inserts into an elongated opening to form multiple loop openings.

FIG. 5C is a cross-sectional view of the second nozzle tip taken along reference line 5C-5C in FIG. 5B. In FIG. 5C the connecting bridging part 156 is not shown.

Figure 6:
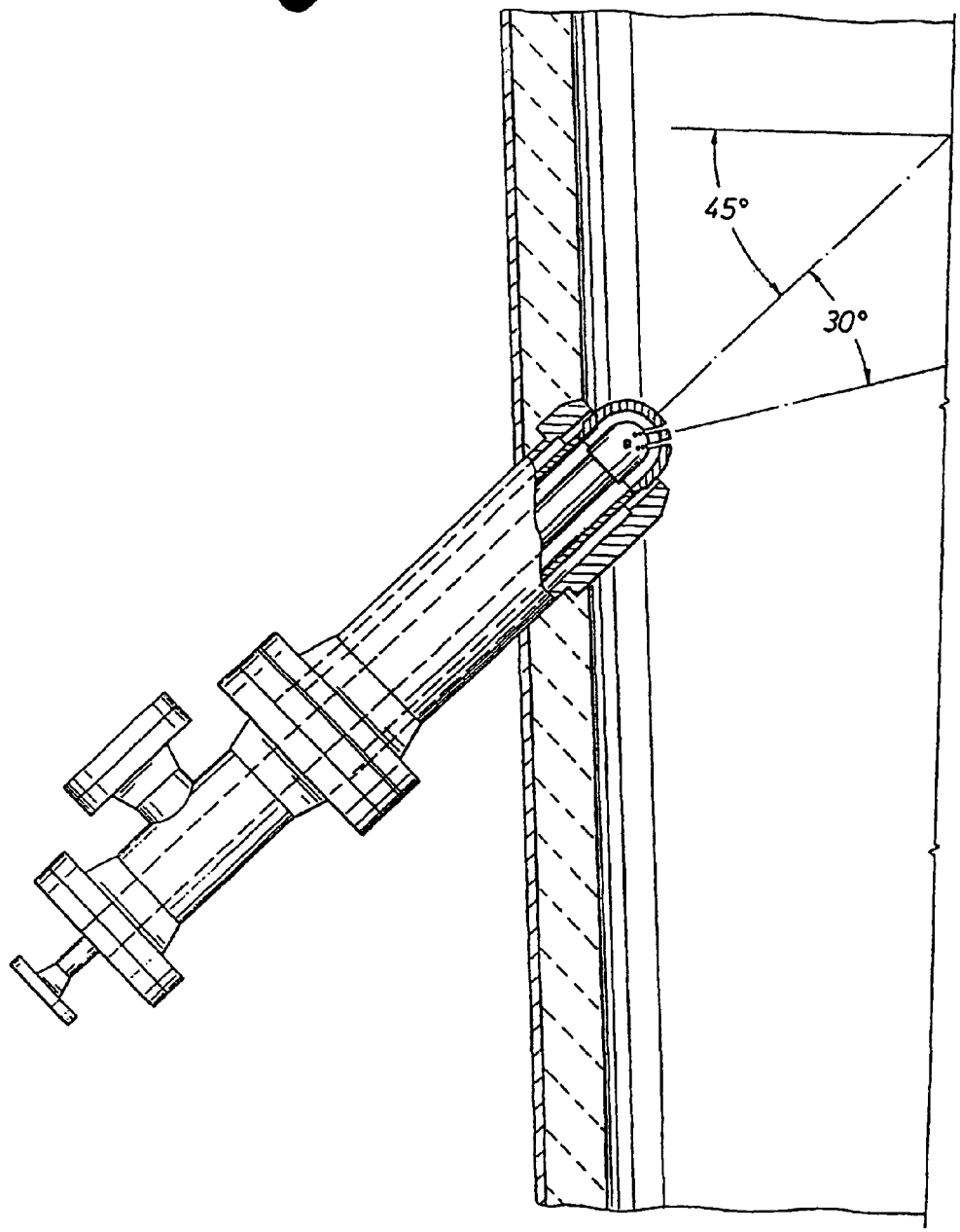
FIG. 6 depicts in one embodiment a side cut away view of the nozzle of this invention in a side entry riser reactor configuration.

FIG. 6 depicts in one embodiment a side cut away view of the nozzle of this invention in a side entry riser reactor configuration. The angle of the outlet openings in the steam (not shown) and hydrocarbon feed nozzles is shown to be below the longitudinal axis of the steam and hydrocarbon conduits. One benefit of this nozzle assembly is that optimum mixing of feed and catalyst can be achieved by adjusting this angle independently. The difference between the injection angle and the axis of the conduits can range from +45° to −45°, and more preferably from +30° to −30°.

One application of this invention that the nozzle body is typically oriented horizontally or diagonally into the riser reactor, wherein the nozzle body will typically protrude through the walls of the riser reactor in an orientation between vertical and horizontal.

Another application of this invention that the nozzle body is protruding through the bottom walls of the riser reactor and typically oriented vertically into the riser reactor, wherein the nozzle body will typically has an off-axis injection, as shown in FIG. 6. In such an embodiment preferably more than one, more preferably between 2 and 12 feed nozzles according to the invention are arranged. Preferably such nozzle are arranged such that the respective sheet like sprays emitted from said nozzles converge towards each other in order to achieve a homogeneous distribution of hydrocarbon droplets in the reactor riser.

That which is claimed is:

1. A feed nozzle assembly for introducing a mixture of gas and liquid hydrocarbon droplets into a vessel in the form of a substantially sheet-like spray, which feed nozzle assembly comprises:
    a nozzle body comprising means to supply the gas and means to supply the liquid hydrocarbon to said nozzle body at an upstream part, and comprising a closed outlet end at a downstream part,
    the closed outlet end comprises an elongated opening and an insert positioned with the elongated opening to form a continuous loop opening for discharge of the mixture of gas and liquid droplets.

2. A feed nozzle according to claim 1, the nozzle body comprising an atomizing means for mixing the gas and the liquid.

3. A feed nozzle according to claim 1, wherein the elongated opening is defined by its maximum length l and its maximum height h and wherein the ratio of l/h is between 1.5 and 20.

4. A feed nozzle according to claim 1, wherein a width of the loop opening is between 1.5 and 20 cm.

5. A feed nozzle according to claim 1, wherein a wall thickness of the downstream part end of the nozzle body at a location of the elongated opening is between 0.5 and 10 cm.

6. A feed nozzle according to claim 1, wherein the outlet end of the nozzle body is dome shaped.

7. A reactor riser provided at its upstream end with an inlet for hot regenerated catalyst particles and at a distance downstream said inlet with at least a side entry feed nozzle according to claim 1, and a reaction zone downstream said feed nozzle position.

8. Reactor riser according to claim 7, wherein the axis which runs along the maximum length l of the elongated opening of the feed nozzle is positioned substantially horizontal.

9. Process to contact a moving stream of catalyst particles with a liquid hydrocarbon reactant in a elongated vertically positioned reactor riser according to claim 8, wherein a mixture of gas and liquid hydrocarbon droplets is introduced using the feed nozzle as a substantially sheet-like spray such that the angle between the sheet-like spray and the axis of the nozzle body is between +45° and −45°.

10. A feed nozzle according to claim 1, wherein atomizing means are present in the nozzle body.

11. A feed nozzle according to claim 1, wherein the elongated opening is defined by its maximum length l and its maximum height h and wherein the ratio of l/h is between 1.5 and 20.

12. A feed nozzle according to claim 11, wherein the insert is fixed at an upstream position in the nozzle body.

13. A feed nozzle according to claim 1, wherein the width of the loop opening is between 1.5 and 20 cm.

14. A feed nozzle according to claim 13, wherein the insert is fixed at an upstream position in the nozzle body.

15. A feed nozzle according to claim 14, wherein atomizing means for mixing the gas and the liquid are present in the nozzle body.

16. A feed nozzle according to claim 1, wherein the outlet end of the nozzle body is dome shaped.

17. A feed nozzle according to claim 16, wherein the insert is fixed at an upstream position in the nozzle body.

18. A feed nozzle according to claim 17, wherein atomizing means are present in the nozzle body.

19. A feed nozzle according to claim 18, wherein the elongated opening is defined by its maximum length l and its maximum height h and wherein the ratio of l/h is between 1.5 and 20.

20. A feed nozzle according to claim 19, wherein the width of the loop opening is between 1.5 and 20 cm.

* * * * *